United States Patent [19]

Moreland, II et al.

[11] 3,996,442
[45] Dec. 7, 1976

[54] INDUCTION HEATING COIL ASSEMBLY FOR HEATING COOKING VESSELS

[75] Inventors: William C. Moreland, II, Export; William R. Cobb, Murrysville, both of Pa.; Terence D. Malarkey, Tempe, Ariz.

[73] Assignee: Westinghouse Electric Corporation, Pittsburgh, Pa.

[22] Filed: Jan. 20, 1975

[21] Appl. No.: 542,313

[52] U.S. Cl. .......................... 219/10.49; 219/10.79; 336/197; 336/232
[51] Int. Cl.² .......................................... H05B 5/08
[58] Field of Search ............. 336/232, 197, 65, 67, 336/208; 219/10.47, 10.79, 458, 460, 463, 464; 338/297

[56] References Cited
UNITED STATES PATENTS

| | | | |
|---|---|---|---|
| 3,258,580 | 6/1966 | Dills | 219/463 |
| 3,348,025 | 10/1967 | Bassett, Jr. et al. | 219/464 X |
| 3,646,321 | 2/1972 | Siegla | 219/460 X |
| 3,710,062 | 1/1973 | Peters, Jr. | 219/10.49 |
| 3,796,850 | 3/1974 | Moreland et al. | 219/10.49 |
| 3,830,216 | 8/1974 | Dodd | 219/464 X |
| 3,838,249 | 9/1974 | Detterbeck | 219/464 X |

*Primary Examiner*—Thomas J. Kozma
*Attorney, Agent, or Firm*—McNenny, Pearne, Gordon, Gail, Dickinson & Schiller

[57] ABSTRACT

An induction heating coil assembly including a flat induction coil wound from a glass-braid-encased multiwire conductor retained on a rigid asbestos-cement support plate by a number of radially-extending metal retainer clips snapped into openings in the support plate. A shorted turn of heavy copper wire encircles the heating coil to confine its magnetic field and act as a coil-proximity spacer in cooperation with the underside of the horizontal glass panel member that forms the pan-support surface of a smooth-top range. Brackets of electrical insulating material provide support for the coil support plate.

7 Claims, 4 Drawing Figures

INDUCTION HEATING COIL ASSEMBLY FOR HEATING COOKING VESSELS

BACKGROUND OF THE INVENTION

1. Field of the Invention

The invention relates to induction heating coil assemblies for induction heating of cooking vessels.

2. Description of the Prior Art

Although the art of constructing induction heating coils for heating cooking vessels is yet to be developed extensively, those coils that are known to exist generally tend to be somewhat complex and entail a measure of expense represented by such as requirement of cooling fans, use of expensive high-temperatue (greater than 200° C) electrical insulating material, etc.

SUMMARY OF THE INVENTION

The induction heating coil assembly as set forth in the foregoing abstract provides a relatively simple, inexpensive and effective means for inductively heating cooking vessels and does not require the use of a cooling fan or extensive use at high-temperature electrical insulating materials.

DESCRIPTION OF A PREFERRED EMBODIMENT

Figure 3:
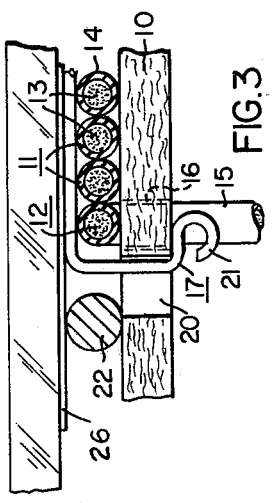
FIG. 3 is an enlarged fragmental view showing details of the heating coil assembly of the preceding figures.
Figure 4:
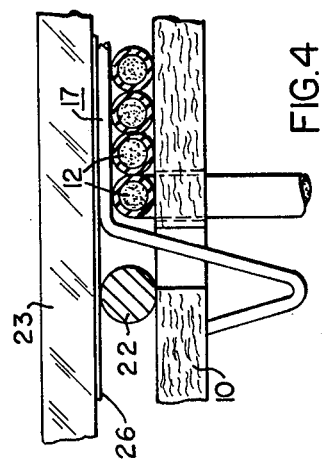
FIG. 4 is a similar view of an alternative construction of the details shown in FIG. 3.
Figure 1:
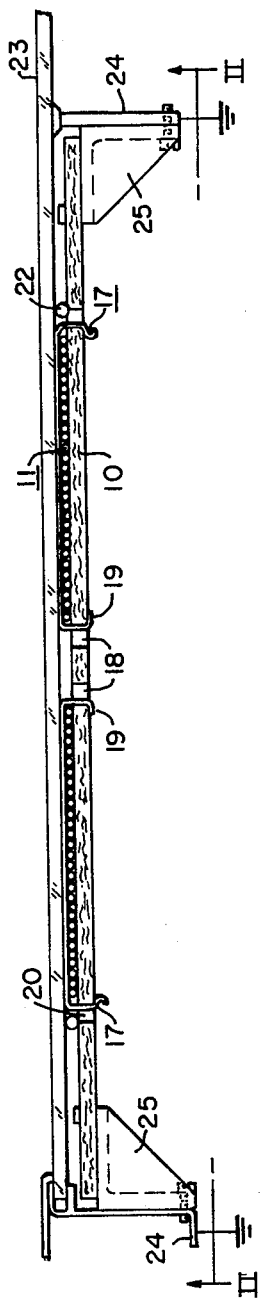
FIG. 1 is a side elevation view, partly in outline and partly in section, of the novel coil assembly shown in affiliation with a respective portion of a smoothtop range cooking-surface panel member.
Figure 2:
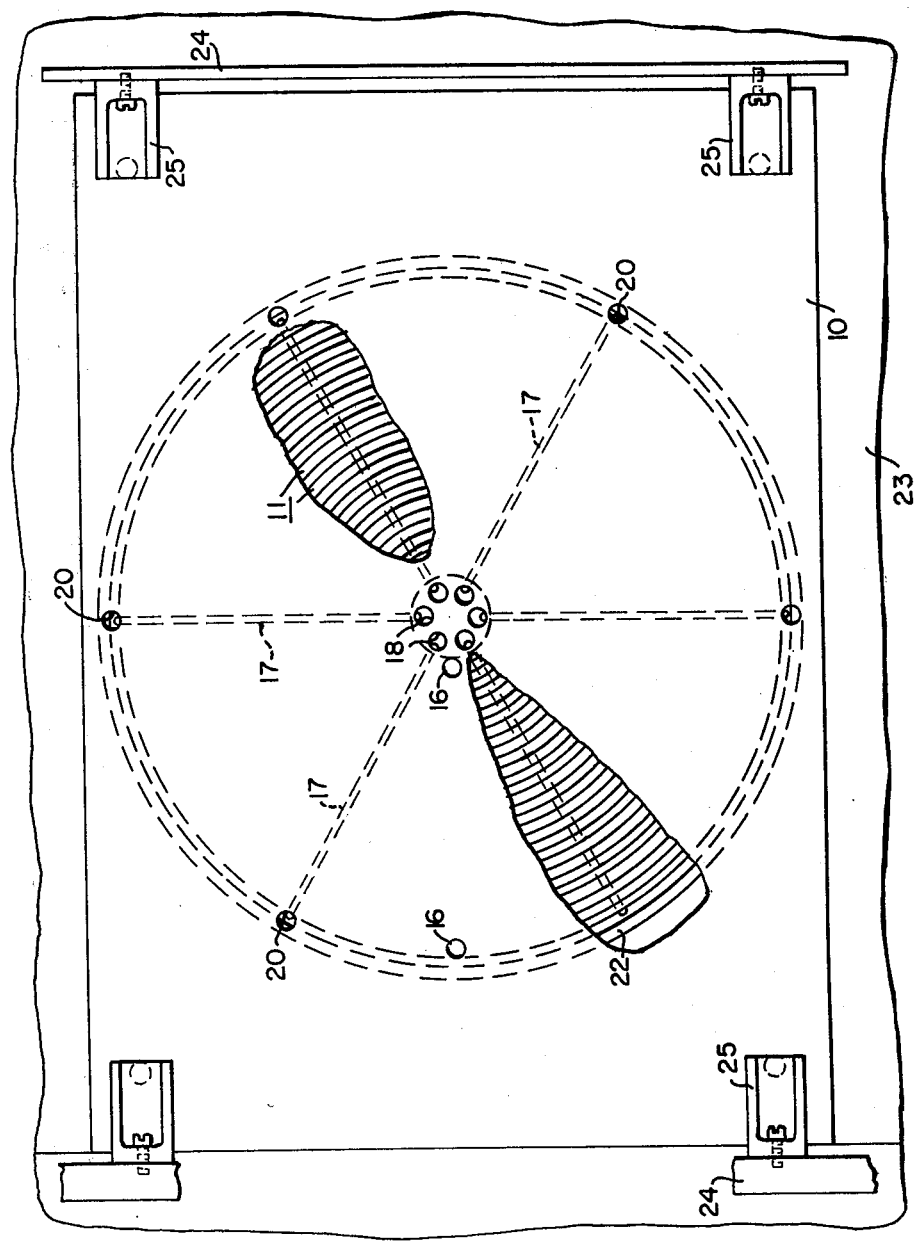
FIG. 2 is a bottom view of the heating coil assembly of FIG. 1, taken in the direction of the arrow II.

Referring to the several figures in the drawing, the induction heating coil assembly of the present invention, as constructed in accord with a working embodiment found to be satisfactory, comprises a flat, rectangular support member 10 of a relatively inexpensive well-known commercial material composed principally of portland cement and asbestos sold under the name Transite, on which is mounted a flat pancake-type induction heating coil 11 made up of thirty turns of a conductor 12 consisting of sixteen strands of No. 24 AWG round enameled copper wire 13 bunched and twisted at 1 to 2 inch lay and covered with a glass fiber braided insulation material 14 such as Owens Corning type ECG 150 1/0. The diameter of the coil is approximately eight and one-half inches (about twenty-two centimeters) for inductively heating the metal bottoms of cook pans of average diameter such as seven to ten inches (18 to 25 centimeters). Opposite ends of the coil 11 are adapted for connection to a source of alternating energizing current by continuation of the innermost and outermost turns downwardly as leads 15 through accommodating openings 16 in the mounting member 10. Coil 11 is retained in place on the mounting member by six retainer clips 17 spaced apart circumferentially of the coil at equal intervals and extending across the top of the coil from its inner to outer diameters. Ends of the clips are constructed, as shown in FIGS. 1 and 3 or 4 to pass through holes 18 in the mounting member 10 as anchor ends 19 at the center of the coil and through mounting member holes 20 as yieldable snap-lock ends 21 at the outer region of such coil. The coil retainer clips 17 may be made of such as 304 stainless steel annealed to be non-magnetic while remaining durable, springlike, and resistive to being heated inductively by the coil 11. In this latter regard, the thickness of the wire of which these clips may be formed should be as small as practical; less than fifty mils (1.27 mm) for example.

A shorted turn 22 of heavy copper conductor is provided in encirclement of the induction heating coil 11 for reducing the magnetic field around the outer periphery of the coil where it is not needed. Such shielding turn 22 may be made of a required length of No. 5AWG copper rod bent to circular shape and brazed together at its ends to form a ring.

Such induction heating coil assembly as described, including the Transite mounting member 10, is adapted to be mounted immediately beneath the horizontal pan-support flat panel member 23 that constitutes the top of a smooth-top range; such member being made of a magnetic-flux-permeable material such as a glass-ceramic that is attractive and easily cleaned. Such mounting is accommodated by structural members 24 affiliated with the cooking range and removably-attached mounting brackets 25 of electrical insulating material that support side edges of the Transite mounting member 10 and are secured thereto. The flux shielding ring 22 in cooperation with the underside of the cook surface member 23 may act as a spacer for the heating coil assembly when installed in place. A thin sheet 26 of such as ten mil (0.254 mm) Nomex 410 insulating material may be in interposition between the heating coil assembly and such member 23 as an added insulating cover for such assembly.

The induction heating coil assembly as described in the foregoing enjoys an advantage in simplicity of construction, in that, for example, the induction heating coil 11 need not necessarily be preformed prior to introduction to the mounting member 10, but rather may be coiled in place on such member, and need not necessarily be embedded in potting compound either for support or for heat protection. Furthermore, the use of Transite as the mounting member material results in considerable savings over high-temperature electrical insulating materials. In the present construction, electrical isolation of the coil 11 from members 24 obtained by the electrically non-conductive molded plastic mounting brackets 25 that support the member 10 which being thermally non-conductive and capable of withstanding a high degree of heat protects such brackets against experiencing excessive heat that might jeopardize its structural integrity.

We claim:

1. An induction heating coil assembly for heating a cooking vessel comprising:
   a multi-turn flat doughnut-shaped induction heating coil having a circular inner periphery defining an open center area and a circular outer periphery, said coil having first and second sides;
   a flat rigid support member of low-heat-conductivity material, said member supporting said coil and being adjacent with one of said sides of said coil, said support member having apertures generally adjacent to said peripheries;
   retainer clips securing said coil to said member, said clips each extending across the other of said sides of said coil, said clips having at least two end portions, each end portion extending through and secured within at least one of said apertures, said clips each extending radially from said open center area to said outer periphery and being circumferentially spaced about said open center area; and a horizonal sheet of magnetic-flux permeable material, said support member and said coil and said clips being positioned against the underside of said sheet, said coil and said clips being interposed between said support member and said sheet.

2. An induction heating coil assembly according to claim 1 including an electrical conductor surrounding said coil, said conductor being a ring interposed between said sheet and said support member.

3. An induction heating coil assembly according to claim 2, wherein said sheet and said member are spaced from each other by a distance approximately equal to a diameter of said conductor.

4. An induction heating assembly according to claim 1 including a layer of electrical insulating material separating said clips and said sheet.

5. An induction heating assembly according to claim 1 including brackets of electrical insulating material supporting said support member.

6. An induction heating assembly according to claim 1 wherein said clips are of a non-magnetic material.

7. An induction heating assembly according to claim 6, wherein said clips are formed of wire having a diameter approximately equal to 50 mils.

* * * * *